United States Patent
Ahluwalia et al.

(10) Patent No.: US 11,265,691 B2
(45) Date of Patent: *Mar. 1, 2022

(54) DEVICE BASED NETWORK NOTIFICATION OF DEVICE SUPPORTED MACHINE-TYPE COMMUNICATION FEATURES

(71) Applicant: AT&T Mobility II LLC, Atlanta, GA (US)

(72) Inventors: Inderpreet Ahluwalia, Austin, TX (US); Darwin Parra, Austin, TX (US); Yupeng Jia, Austin, TX (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/861,361

(22) Filed: Apr. 29, 2020

(65) Prior Publication Data

US 2020/0260244 A1   Aug. 13, 2020

Related U.S. Application Data

(63) Continuation of application No. 16/197,421, filed on Nov. 21, 2018, now Pat. No. 10,681,512, which is a
(Continued)

(51) Int. Cl.
*H04W 4/50* (2018.01)
*H04B 1/3816* (2015.01)
(Continued)

(52) U.S. Cl.
CPC ............ *H04W 4/50* (2018.02); *H04B 1/3816* (2013.01); *H04W 4/14* (2013.01); *H04W 4/70* (2018.02);
(Continued)

(58) Field of Classification Search
CPC .... H04B 1/3816; H04W 4/001; H04W 4/005; H04W 4/14; H04W 4/50; H04W 4/70; H04W 8/22; H04W 8/24; H04W 76/10
See application file for complete search history.

(56) References Cited

U.S. PATENT DOCUMENTS 8,730,820 B2   5/2014   Poon et al.
8,838,806 B2   9/2014   Lu et al.
(Continued)

FOREIGN PATENT DOCUMENTS

EP   2 910 041 A2   8/2015
FR   2 984 050 A1   6/2013
(Continued)

OTHER PUBLICATIONS

Non-Final Office Action received for U.S. Appl. No. 15/370,108 dated Apr. 5, 2018, 28 pages.
(Continued)

*Primary Examiner* — Khoa Huynh
(74) *Attorney, Agent, or Firm* — Amin, Turocy & Watson, LLP

(57) ABSTRACT

The disclosed subject matter provides a proactive device initiated mechanism for notifying a network device regarding device supported machine-type communication (MTC) features. In one embodiment, a method is provided that includes identifying, by a device comprising a processor, machine-type communication related parameters of the device using a subscriber identity module application stored on a subscriber identity module card of the device. The method can further include generating, by the device using the subscriber identity module application, parameter information that identifies the machine-type communication related parameters of the device based on the identifying, and sending, by the device, the parameter information to a
(Continued)

network server device of a wireless communication network based on the generating.

20 Claims, 10 Drawing Sheets

Related U.S. Application Data continuation of application No. 15/370,108, filed on Dec. 6, 2016, now Pat. No. 10,171,968.

(51) Int. Cl.
*H04W 4/14* (2009.01)
*H04W 8/22* (2009.01)
*H04W 8/24* (2009.01)
*H04W 4/70* (2018.01)
*H04W 76/10* (2018.01)

(52) U.S. Cl.
CPC ............... *H04W 8/22* (2013.01); *H04W 8/24* (2013.01); *H04W 76/10* (2018.02)

(56) References Cited

U.S. PATENT DOCUMENTS

| | | | |
|---|---|---|---|
| 9,119,131 B2 | 8/2015 | Mohammed et al. | |
| 9,148,748 B2 | 9/2015 | Wang et al. | |
| 9,226,095 B2 | 12/2015 | Mufti | |
| 9,253,798 B2 | 2/2016 | Pani et al. | |
| 9,295,082 B2 | 3/2016 | Sennett et al. | |
| 9,300,480 B2 | 3/2016 | Kim et al. | |
| 2011/0199905 A1 | 8/2011 | Pinheiro et al. | |
| 2011/0213871 A1 | 9/2011 | DiGirolamo et al. | |
| 2011/0287765 A1 | 11/2011 | Russell et al. | |
| 2013/0294283 A1 | 11/2013 | Van Phan et al. | |
| 2014/0098756 A1* | 4/2014 | Tabatabaei Yazdi | H04W 4/70 370/329 |
| 2015/0016307 A1* | 1/2015 | Liu | H04L 12/1432 370/259 |
| 2015/0131475 A1 | 5/2015 | Van Phan et al. | |
| 2015/0189459 A1* | 7/2015 | Aon | H04W 4/70 455/558 |
| 2015/0215346 A1 | 7/2015 | Kotecha et al. | |
| 2016/0182459 A1 | 6/2016 | Britt et al. | |
| 2016/0197772 A1 | 7/2016 | Britt et al. | |
| 2016/0234826 A1* | 8/2016 | Chen | H04L 5/0091 |
| 2017/0280319 A1* | 9/2017 | Breuer | H04W 12/35 |

FOREIGN PATENT DOCUMENTS

| | | |
|---|---|---|
| WO | 2015/169872 A1 | 11/2015 |
| WO | 2016/026746 A1 | 2/2016 |

OTHER PUBLICATIONS

Sachs et al., "Capillary networks—a smart way to get things connected." https://pdfs.semanticscholar.org/1397/f2edb5c0daed13c628dc193ac5e8340d75fb.pdf. Ericsson Review, Sep. 9, 2014. Disclosing device characteristics and details stored in a SIM card, 8 pages.

Spiess et al., "SOA-based Integration of the Internet of Things in Enterprise Services." http://www.socrades.net/Documents/objects/file1259604734.pdf. Web Services, 2009. ICWS 2009. IEEE International Conference on. IEEE, 2009. Discloses identifying discovered device's type, 8 pages.

Jammes et al., "Service-Oriented Device Communications using the Devices profile for web services.". Proceedings of the 3rd international workshop on Middleware for pervasive and adhoc computing. https://www.oasis-open.org/committees/download.php/33397/Service-oriented%20device%20communications%20using%20DPWS.pdf ACM, 2005. Disclosing storing device type and characteristics as part of metadata (the Device Profile for Web Services (DPWS), 8 pages.

Song et al., "Semantic middleware for the internet of things," http://www.caad.arch.ethz.ch/noolab/files/external/conferences/IoT2010_proceedings/pdf/Conference/Io T%20Development/C23.pdf. Internet of Things (IOT), 2010. IEEE, 2010. Disclosing a discovery module that matches devices with a set of OWLS descriptions to determine capabilities, 8 pages.

Russell Rusty., "virtio: Towards a de-Facto Standard for Virtual I/O devices,". ACM SIGOPS Operating Systems Review 42.5 (2008): 95103. https://www.ozlabs.org/~rusty/virtio-spec/virtio-paper.pdf. Discloses determining device capabilities by corresponding feature bits, 9 pages.

Non-Final Office Action received for U.S. Appl. No. 16/197,421 dated Jul. 11, 2019, 22 pages.

* cited by examiner

MTC DEVICE TYPE/CATEGORY

| MTC support on Downlink (DL) i.e. Network → UE | MTC support on Uplink (UL) i.e. UE → Network | Value (Hex) |
|---|---|---|
| MTC Not supported | MTC Not Supported | 00 |
| M1 | M1 | 01 |
| M2 | M2 | 02 |
| CAT 0 | CAT 0 | 03 |
| CAT 1 | CAT 1 | 04 |
| CAT 2 | CAT 2 | 05 |
| CAT 3 | CAT 3 | 06 |
| CAT 4 | CAT 4 | 07 |
| CAT 5 | CAT 5 | 08 |
| CAT 6 | CAT 6 | 09 |
| CAT 7 | CAT 7 | 0A |
| CAT 8 | CAT 8 | 0B |
| CAT 9 | CAT 9 | 0C |
| CAT 10 | CAT 10 | 0D |
| CAT 11 | CAT 11 | 0E |
| CAT 12 | CAT 12 | 0F |
| CAT 6 | CAT 4 | 10 |
| CAT 6 | CAT 5 | 11 |
| CAT 7 | CAT 4 | 12 |
| CAT 7 | CAT 13 | 13 |
| CAT 9 | CAT 4 | 14 |
| CAT 9 | CAT 5 | 15 |
| CAT 9 | CAT 6 | 16 |
| CAT 10 | CAT 4 | 17 |
| CAT 10 | CAT 7 | 18 |
| CAT 10 | CAT 13 | 19 |
| Etc. | Etc. | Etc. |

FIG. 4

DEVICE BASED NETWORK NOTIFICATION OF DEVICE SUPPORTED MACHINE-TYPE COMMUNICATION FEATURES

CROSS-REFERENCE TO RELATED APPLICATIONS

This application is a continuation of, and claims the benefit of priority to each of, U.S. patent application Ser. No. 16/197,421 (now U.S. Pat. No. 10,681,512), filed Nov. 21, 2018 and titled "DEVICE BASED NETWORK NOTIFICATION OF DEVICE SUPPORTED MACHINE-TYPE COMMUNICATION FEATURES," which is a continuation of U.S. patent application Ser. No. 15/370,108 (now U.S. Pat. No. 10,171,968), filed Dec. 6, 2016 and titled "DEVICE BASED NETWORK NOTIFICATION OF DEVICE SUPPORTED MACHINE-TYPE COMMUNICATION FEATURES," the entireties of which applications are incorporated herein by reference.

TECHNICAL FIELD

The disclosed subject matter relates to techniques for providing device based network notification of device supported machine-type communication (MTC) features.

BACKGROUND

Machine-type communication (MTC) or machine-to-machine communication (M2M) refers to automated data communications among devices and the underlying data transport infrastructure. The data communications may occur between an MTC device and a server, or directly between two MTC devices. MTC has great potential in a wide range of applications and services that are widespread across different industries, including healthcare, logistics, manufacturing, process automation, energy, and utilities. To spread these applications widely, cellular systems are considered as a potential candidate to provide connectivity for MTC devices. However, the potential MTC applications have very different features and requirements, which imply constraints on the cellular network technology as well as on MTC devices. As a result, different types of MTC devices and different MTC device operating features are being developed and implemented to satisfy the diverse device requirements while balancing overall network service provisioning quality and efficiency. In order to manage MTC service provisioning effectively, the network is informed of the different MTC features and functionalities of the MTC devices serviced by the network. However, current mechanisms for determining capabilities of user equipments (UEs) serviced by cellular network systems are not suitable for collecting device capability information for MTC devices.

BRIEF DESCRIPTION OF DRAWINGS

FIG. 4 provides a chart illustrating example MTC device type/category information in accordance with various aspects and embodiments of the subject disclosure.

DETAILED DESCRIPTION

Figure 1:
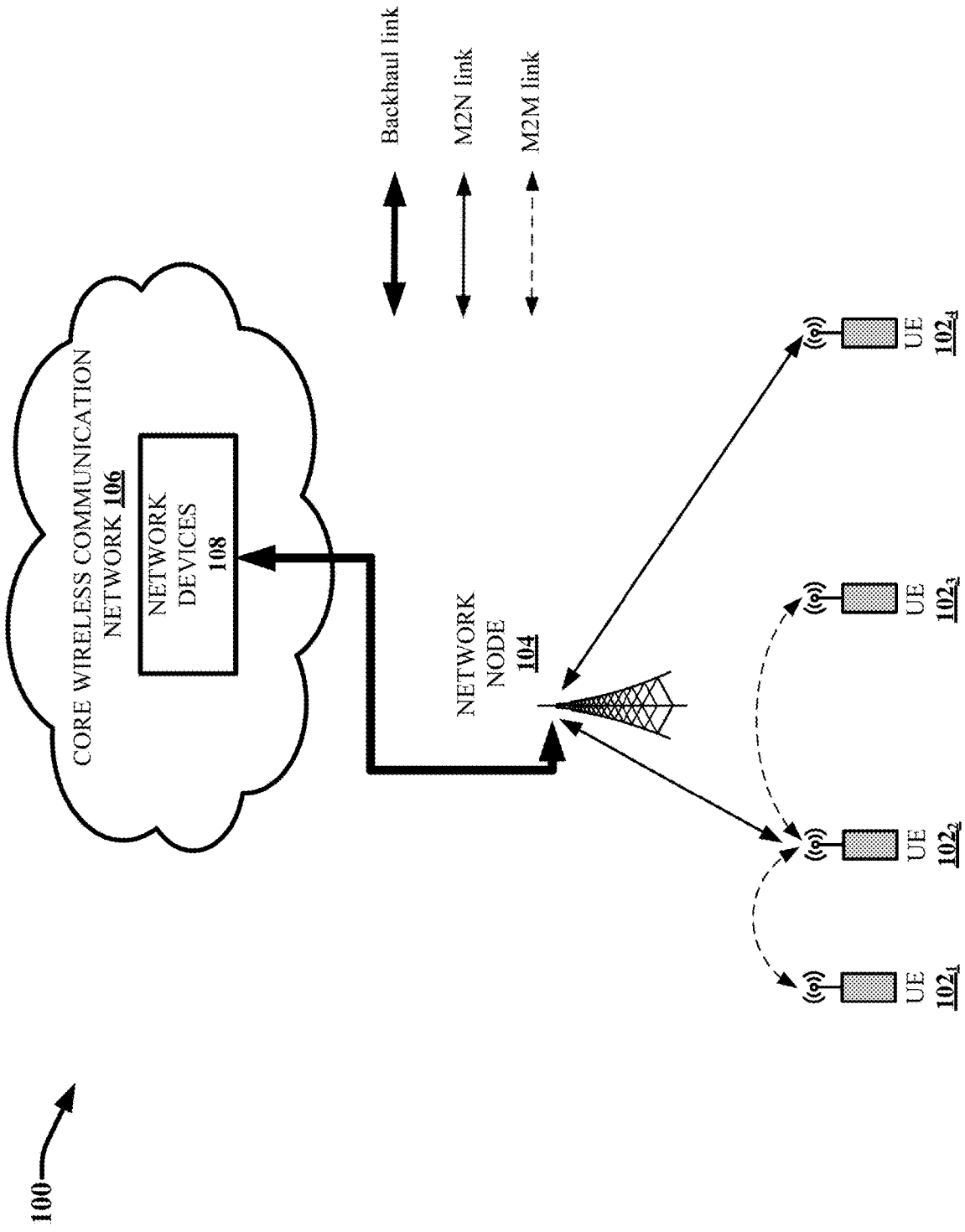
FIG. 1 is an illustration of an example wireless communication system that facilitates device based network notification of device supported MTC features in accordance with various aspects and embodiments of the subject disclosure.

In current cellular network systems (e.g., third generation partnership project systems (3GPP) and the like), UE capability information is signaled to a terminating point in a number of ways depending on the type of the capability information and the features and functionalities of the UE. For example, between the universal integrated circuit card (UICC) or the subscriber identity module (SIM) card and the UE, some device capability information is communicated via an information download procedure referred to a "terminal profile download" procedure. Other device capability information is communicated between the UE and the network via a UE capability information message (e.g., referred to as a "Classmark capability message" in 3GPP systems) sent by the UE via an over-the-air (OTA) interface.

The different mechanisms via which UE capability information is currently provided to a terminating point however are limited in what information can be conveyed and how it can be used. For example, the capability information associated with the terminal profile download procedure only describes SIM application toolkit (STK) or card application toolkit (CAT) based device information so that an STK/CAT application on the SIM or UICC knows what the device supports and can possibly adjust its behavior accordingly. The information associated with the terminal profile download procedure does not contain any non-STK based information, such as information regarding radio capabilities of the device. On the other hand, although a UE capability information message can be used to transfer UE radio access capabilities such as supported radio access technology (RAT), frequency bands, and supported radio/network, this type of UE capability information is only received by the network in response to a direct request for the information from the network. For example, in order for the network to receive such UE capability information, the network must send the UE a UE "capability enquiry message" (e.g., a reactive procedure as opposed to a proactive procedure).

Additionally, the particular network device that receives the UE capability information in response to a capability enquiry message does not provide the UE capability information to other network elements that may need the capability information to facilitate new MTC related services associated with the UEs (e.g., provisioning systems and billing systems).

The subject disclosure is directed to computer processing systems, computer-implemented methods, apparatus and/or computer program products that facilitate device based network notification of device supported MTC features. In particular, the subject disclosure defines a proactive mechanism that can be used by a UE to convey certain key MTC device capability information to a network server device, referred to herein at the "device capability collection server," (DCCS). The DCCS can further provide the MTC device capability information to other network servers and core network devices, such as network servers and core network devices associated with network billing and service provisioning systems. These other network servers and core network devices can further use the MTC device capability information to facilitate provisioning MTC services to MTC devices and/or to enable, disable, track, update, reconfigure, etc., MTC related device capabilities.

In one or more embodiments, a method is provided that includes identifying, by a device comprising a processor, MTC related parameters of the device using a subscriber identity module application stored on a subscriber identity module card of the device. The method further includes generating, by the device using the subscriber identity module application, MTC parameter information that identifies the MTC related parameters of the device based on the identifying, and sending, by the device, the MTC parameter information to a network server device of a wireless communication network based on the generating.

In another embodiment, a device is provided that includes a transmitter and an integrated circuit (IC) card. In one implementation, the IC card is a SIM card. In another implementation, the IC card is a UICC. The IC card can comprise a processor, and a memory that stores executable instructions that, when executed by the processor, facilitate performance of various operations. These operations can include, determining MTC related parameters of the device, and generating MTC parameter information that identifies the MTC related parameters of the device based on the determining. These operations can further include, directing, based on the generating, the transmitter to send the MTC parameter information to a network server device of a wireless communication network via a communication link between the device and an access point device of the wireless communication network.

In yet another embodiment, a machine-readable storage medium is provided, comprising executable instructions that, when executed by a processor of a device, facilitate performance of operations. These operations can include identifying MTC related parameters of the device using a device capability information application stored on a universal integrated circuit card of the device. The operations can further include generating, using the device capability information application, MTC parameter information that identifies the MTC related parameters of the device based on the identifying; and, sending the MTC parameter information to a network server device of a wireless communication network based on the generating.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates device based network notification of device supported MTC features in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The wireless communication system 100 can be or include various types of disparate networks, including but not limited to: cellular networks, femto networks, picocell networks, microcell networks, internet protocol (IP) networks Wi-Fi service networks, broadband service network, enterprise networks, cloud based networks, and the like. System 100 can comprise one or more UEs 102, a network node 104 and a core wireless communication network 106. It should be appreciated that four UEs (UEs $102_{1-4}$) are merely arbitrarily depicted for exemplary purposes and that any number N UEs can be included in system 100. The UEs 102 can include a variety of different mobile and stationary device types, including but not limited to: a cellular phone, a smartphone, a tablet computer, a wearable device, a virtual reality (VR) device, a heads-up display (HUD) device, and the like. In various exemplary embodiments, the UEs 102 can be configured with MTC or M2M capabilities. For example, the UEs 102 can be or include metering devices, implantable medical device (IMDs), sensor and/or control devices associated with home automation systems, tracking devices, point of sale devices (e.g., vending, machines), security devices (e.g., associated with surveillance systems, homes security, access control, etc.), and the like. The terms MTC and M2M are used herein interchanged. A UE that is configured to perform one or more MTC functionalities is referred to herein as an MTC device.

In some implementations, the UEs 102 can be configured to communicate with one another using a machine-to-machine (M2M) link (indicated by the dashed arrow lines). For example, in the embodiment shown, UEs $102_1$ and $102_2$ have established an M2M link and UEs $102_2$ and $102_3$ have also established an M2M link. One or more of the UEs 102 can further be configured to communicate with a core wireless communication network 106 (i.e., one or more network devices 108 of the core wireless communication network 106) using a communication link established between the UE 102 and a network node 104 of the wireless communication network (e.g., indicated by the thin dashed arrow lines). A communication link between a UE and a network access point device such as network node 104 is referred to herein as machine-to-network (M2N) communication link. For example, in the embodiment shown, UEs 102$_2$ and UE 1024 have established M2N wireless communication links with the network node 104. In some implementations, a UE 102 can serve as an access point device to other UEs via which the other UEs can communicate with the network node 104. For example, in the embodiment shown, UE 102$_2$ serves as a network access point device for UEs 102$_1$ and 102$_3$.

The wireless communication system 100 can employ various wireless communication technologies and modulation schemes to facilitate wireless radio communications between devices (e.g., between UEs 102 and between UEs 102 and the network node 104). For example, the UEs 102 can be configured to communicate with the network node 104 and/or one another using various wireless communication technologies, including but not limited to: Universal Mobile Telecommunications System (UMTS) technologies, Long Term Evolution (LTE) technologies, advanced LTE technologies (including voice over LTE or VoLTE), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIG-BEE® technologies, or another IEEE 802.XX technology. Additionally, substantially all aspects disclosed herein can be exploited in legacy telecommunication technologies. In some embodiments, the UEs can be configured to communicate with one another (e.g., via M2M links) using suitable local area network (LAN) or personal area network (PAN) communication technologies and configured to communicate with the network node 104 using suitable WAN communication technologies. For example, in one or more embodiments, the UEs 102 can be configured to communicate with one another using BLUETOOTH®, BLUETOOTH® low energy (BLE), near field communication (NFC), Wi-Fi protocol, ZIGBEE®, RF4CE, WirelessHART, 6LoWPAN, Z-Wave, ANT, and the like. The one or more UEs 102 can be further configured to communicate with the network node 104 using one or more of the radio access network (RAN) technologies listed above (e.g., LTE, VoLTE, UMTS, etc.).

The non-limiting term network node (or radio network node) is used herein to refer to any type of network node serving a UE 102 and/or connected to other network node, network element, or another network node from which the UE 102 can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like.

The core wireless communication network 106 can include various network devices 108 that facilitate providing wireless communication services to the UEs 102 via the network node 104 and/or various additional network devices (not shown). For example, the network devices 108 of the core network can include mobile switching center (MSCs) devices, a home location register (HLR) device, a visitor location register (VLR) device, authentication center (AUC) devices, provisioning servers, billing servers, operation and support system (OSS) devices, short message service center (SMSC) devices, and many other elements. In one or more exemplary embodiments in which the UEs 102 are or include MTC devices, the network devices 108 can include one or more network devices that facilitate various MTC services supported by the respective UEs 102 (e.g., the DCCS, MTC application servers, and other elements). The network node 104 connects the UEs to the core wireless communication network 106. The network node can be connected to the core wireless communication network via one or more backhaul links (indicated by the thick arrow line). For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

The subject disclosure provides a mechanism for automatically collecting, by the core wireless communication network 106, MTC capability information about the UEs 102 serviced by the wireless communication network. In particular, in one or more embodiments, the UEs 102 of system 100 can be configured to determine defined MTC capability information in response to start-up (i.e., powering on), in response to a reset procedure, or another defined event. For example, in response to start-up, each of the UEs 102 can be configured to identify or determine information including a defined MTC device type or category of the UE and defined MTC related features supported or not supported by the UE. The UEs 102 can further be configured to automatically send their MTC capability information to a specific network device of the core wireless communication network 106 in association with establishment of an M2N connection between the UE and a network node (e.g., network node 104). This network device is referred to herein as the device capability collection server (DCCS). The DCCS can further store the MTC device capability information in a database accessible to other network devices of the core wireless communication network and/or provide the MTC device capability information to the other network devices to facilitate managing various MTC related operations of the UEs.

The specific parts of the MTC capability information that are employed by the other network devices and/or the manner in which the MTC capability information is employed by the other network devices can vary. For example, in some implementations, the MTC capability information can be employed by one or more provisioning servers of the wireless communication network to facilitate provisioning MTC services for the respective UEs. In telecommunication, provisioning involves the process of preparing and equipping the network to allow it to provide (new) services to its UEs. Accordingly, using MTC capability information for a UE, a provisioning server of the wireless communication network can configure any required network elements to provide the UE with MTC services supported by a UE in accordance with business logic and resource management operations employed by the wireless communication network. Thus in some implementations, a provisioning server of the core wireless communication network 106 can employ MTC device capability information to enable and/or disable different MTC services provided by the wireless communication network to the MTC device. In another example, the MTC capability information can be employed by a billing server of the wireless communication network to facilitate charging a user account associated with a UE in accordance with the services provisioned for the UE based on the MTC capabilities of the UE. Other possible uses of device MTC capability information can include UE tracking, controlling MTC operations of the UE, controlling non MTC operations of the UE that have an effect on the MTC operations of the UE, and adjusting operating parameters associated with MTC features supported by the UE.

Figure 2:
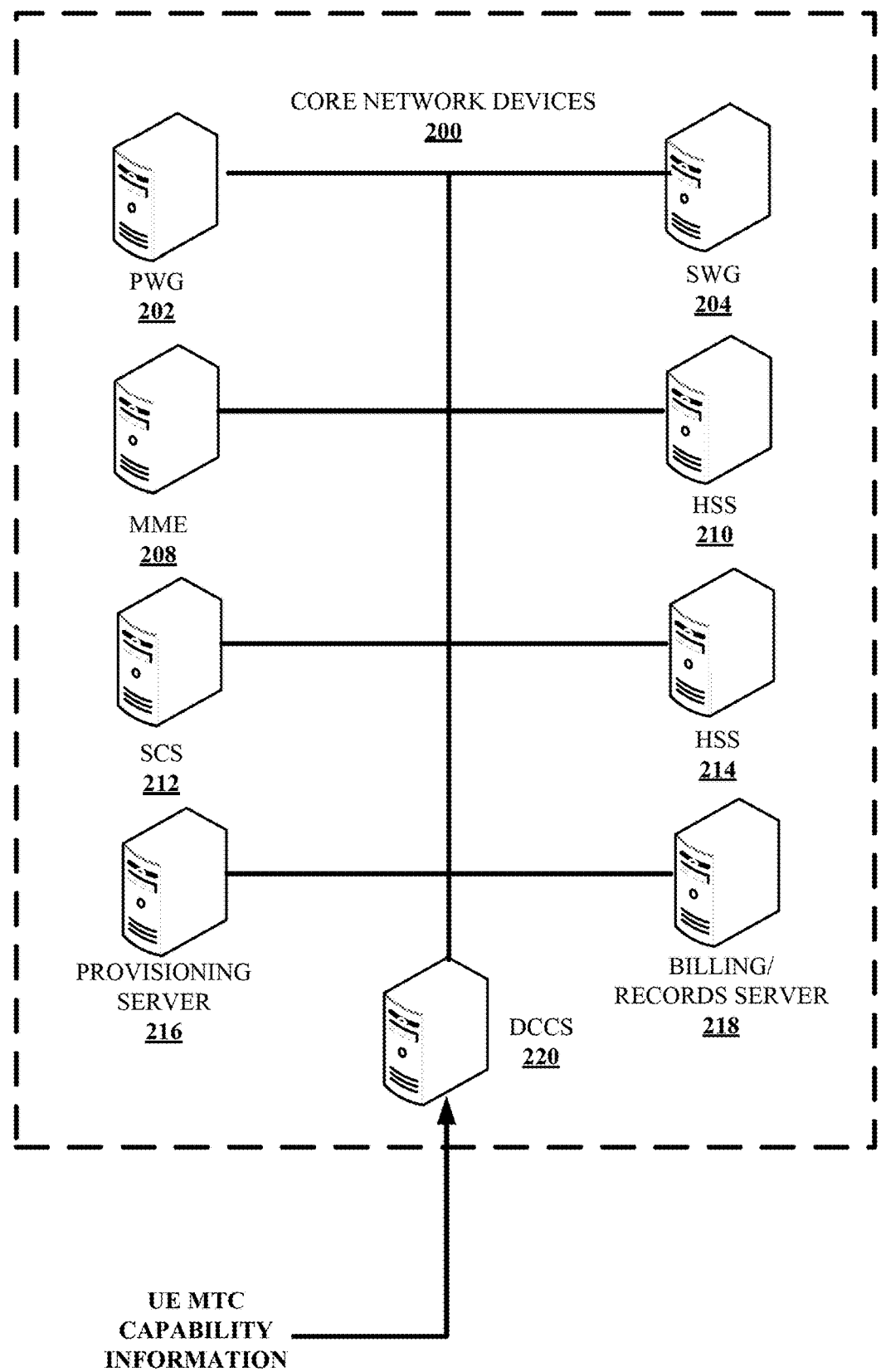
FIG. 2 presents example network devices that facilitate providing wireless communication services to the UEs in accordance with various aspects and embodiments of the subject disclosure.

For example, FIG. 2 presents some example network devices 200 of a wireless communication that facilitate providing wireless communication services to the UEs by the wireless communication network in accordance with various aspects and embodiments of the subject disclosure. In various embodiments, the one or more of the network devices 108 of system 100 can be or include one or more of the network devices 200. Repetitive description of like elements employed in respective embodiments is omitted for sake of brevity.

As shown in FIG. 2, the network devices 200 can include but are not limited to: a packet data network gateway (PWG) server 202, a service gateway (SGW) server 204, a mobility management entity (MME) server 206, a home subscriber server (HSS) 208, service capability server (SCS) 212, a MTC-interworking function (MTC-IWF) server 214, a provisioning server 216, a billing/records server 218 and a DCCS 220. The PGW and the SGW are responsible for forwarding UE data traffic to and from the network via the so-called bearers, (i.e. channels created with the end users). The MME is responsible for all mobility related functions, paging, authentication, and bearer management in the network. The HSS functions as a main database containing subscription-related information. The SCS entity is designed to offer services for MTC applications hosted in external networks. The MTC-IWF hides the internal public land mobile network (PLMN) topology and relays or translates signaling protocols to invoke specific functionalities in PLMN. This entity is also responsible for relaying trigger requests from the SCS after checking authorization and reporting the acceptance or denial of these requests. The provisioning server 216 is responsible for provision services for UEs, including MTC services and the billing/records server 218 is responsible for billing user accounts associated with the UEs in association with services provisioned and utilized by the respective UEs, including MTC services.

The DCCS is configured to automatically receive UE MTC capability information sent by respective UEs (e.g., UEs 102). The DCCS can further store the UE MTC capability information in a database that is accessible to one or more other core network devices (e.g., the a packet data network gateway (PWG) server 202, the service gateway (SGW) server 204, the mobility management entity (MME) server 206, the home subscriber server (HSS) 208, service capability server (SCS) 212, the MTC-interworking function (MTC-IWF) server 214, the provisioning server 216, and the billing/records server 218). In some implementations, the DCCS can be configured to automatically provide the UE MTC capability information, or defined parts of the UE MTC capability information, to one or more other network devices of the network devices 200. In some embodiments, the DCCS can be or include an international mobile equipment identity (IMEI) trigger platform or ITP. For example, in some existing cellular systems, the ITP has been responsible for maintaining device information for devices serviced by the network. This device information has included device IMEI numbers, terminal profile information, and device location information. The mechanisms via which the different types of device information are received by the ITP vary. In some implementations, the ITP also maintains a terminal support table with some information regarding non-MTC device capability information, such as radio capabilities of the device.

With reference back to FIG. 1, in accordance with various embodiments, the mechanism via which a UE (e.g., UEs 102) determines MTC capability information and automatically provides the MTC capability information to the DCCS is based on a dedicated STK or CAT application provided on a SIM card or UICC, respectively, of the UE. This application is referred to herein as the "capability information application." The terms SIM card and UICC are used herein interchangeably to refer to an integrated circuit card that provides same or similar features and functionalities when employed in association with a UE that is configured to operate using a wireless communication network. In general, the SIM card and the UICC contain unique information that identifies a UE to a wireless communication network with which the SIM card or UICC is registered and enables the UE to operate using the wireless communication network. In addition to storing secure device information, both the SIM card and UICC have applications (e.g., STK and CAT applications, respectively) that define how the SIM or UICC should interact directly with the outside world. The STK and CAT applications can initiate commands independently of the UE on the network. This enables the SIM/UICC to build up an interactive exchange between a network application and the end user and access, or control access to the network. The UICC is considered a next generation SIM card and has applications beyond GSM networks.

In one or more embodiments, the capability information application provided on the SIM/UICC of a UE (e.g., UEs 102) is configured to identify or determine defined MTC capabilities of the UE in response to start-up of the UE, a device reset, a new power cycle or another defined event. In various implementations, the defined MTC capabilities can include a defined MTC device type or category of the UE. For example, in 3GGP cellular systems, categories are used to define general UE performance characteristics such as maximum supported data rate in uplink and downlink data channels, and to what extent different multi-antenna capabilities and modulation schemes are supported. 3GPP also uses the concept of "Releases" to refer to a stable set of specifications, which can be used for implementation of features at a given point of time. In Release 12, UE categories range from Category 0 (Cat-0) up to Cat-13. With a Cat-1 UE, it is possible to achieve 10 mega-bytes per second (Mbps) downlink and 5 Mbps uplink channel data rates. No multiple-input multiple output (MIMO) is supported but the UE should still have 2 receiver antennas. Release 13 includes further UE Categories including at least the socalled "Cat-M1" and "Cat-M2" intended for "Internet of things" (IoT) MTC devices. Cat-M1 and Cat-M2 respectively have complexity reductions relative to Cat-0 and Cat-1. For example, Cat-M1 UEs have up to about 75-80% complexity reductions compared to Cat-1 devices and Cat-M2 devices have up to about 90% complexity reductions compared to Cat-1 devices. One major difference between Cat-1 UEs and the "machine" (M) categories M1 and M2 relative to Cat-1 UEs is the ability to implement the UE transmitter and receiver parts with reduced bandwidth compared to normal LTE UEs operating with 20 MHz bandwidth.

The defined MTC capabilities can further include defined MTC operating features supported and/or not supported by the UE. For example, two potential MTC operating features that may be supported by a UE (e.g., UEs 102), respectively referred as extended discontinuous reception (eDRX) and power saving mode (PSM), are features that enable UEs to have very long battery lifetimes, 10 years or more. The eDRX feature means the UE is configured to employ extended DRX cycles and provides the UE with longer sleeping periods between reading paging or control channels. The PSM feature allows the UE to save power when there is no frequent need for other devices to communicate with the UE. In addition to eDRX and PSM, other potential MTC operating features that can be supported by a UE can include but are not limited to: Non-Access Stratum (NAS) Signaling Priority support, Minimum Periodic Search Timer support, Extended Access Barring support, Timer T3245 support, Override NAS Signaling Low Priority support, Override Extended Access Barring support, SM-Retry Wait Time support, Delay Tolerant Access support, Coverage Enhancement Mode A (CEModeA) support, Coverage Enhancement Mode B (CEModeB) support, Idle Mode Extended Discontinuous Reception (eDRx) support, Connected Mode Extended Discontinuous Reception (eDRx) support, Positioning support, and Single Cell-Point to Multipoint Transmission (SC-PTM) support.

Accordingly, in response to start-up of a UE (or another defined event), the capability information application can be configured to determine an MTC category of the UE and what MTC operating features the UE supports (and/or does not support). The capability information application can further generate MTC capability information that identifies the specific MTC device type or category of the UE and the MTC operating features that are supported and/or not supported by the UE. For example, the capability information application can create a data file with information identifying the MTC device category and operating features. In some embodiments, in association with generation of the MTC capability information, the capability information application can be configured to store the MTC capability information in a data structure that is stored on the device SIM/UICC. In various implementations, this data structure is referred to as the "terminal support table." For example, in response to start-up of the UE, the capability information application can interface with the UE and identify or determine the defined MTC capabilities of the UE (e.g., the MTC category and MTC operating features). The capability information application can further write the device MTC capability information to the terminal support table. The capability information application (or another reporting application stored on the SIM/UICC) can further be configured to send or direct the UE to send (e.g., using a transmitter of the UE) the MTC capability information to the DCCS using an OTA message sent via a M2S wireless communication link established between the UE and a network node (e.g., network node 104).

Figure 3:
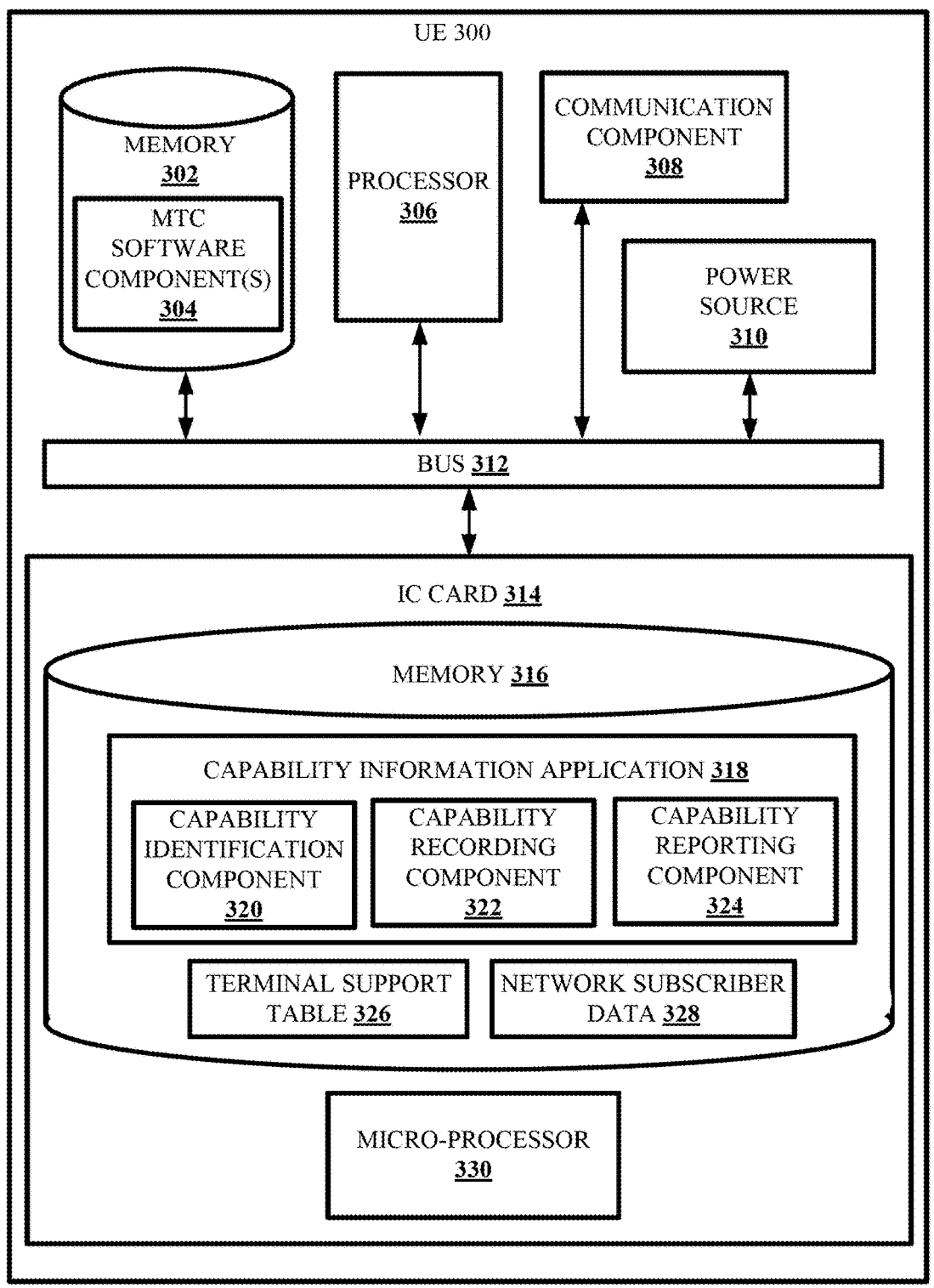
FIG. 3 is an illustration of an example UE that facilitates device based network notification of device MTC features in accordance with various aspects and embodiments of the subject disclosure.

FIG. 3 is an illustration of an example UE 300 that facilitates device based network notification of device MTC features in accordance with various aspects and embodiments of the subject disclosure. In various embodiments, the one or more of the UEs 102 of system 100 can be or include UE 300, and vice versa. Repetitive description of like elements employed in respective embodiments is omitted for sake of brevity.

The UE can include memory 302 configured to store computer executable components and instructions. For example, in various embodiments, these computer executable components and instructions can include one or more MTC software components 304. The one or more MTC software components 304 can include components or instructions that control one or more defined MTC related operating parameters of the UE, such as eDRX, PSM and other possible MTC operating features. The UE 300 can also include a processor 306 to facilitate operation of the instructions (e.g., the computer executable components and instructions) by the UE (e.g., the one or more MTC software components). The UE 300 further includes a communication component 308, a power source 310 and an IC card 314 and a device bus 312. The device bus 312 can couple the various components of the UE including, but not limited to, the memory 302, the processor 306, the communication component 308, the power source 310, and the IC card 314. Examples of said processor 306 and memory 302, as well as other suitable computer or computing-based elements that can be employed by the UE, can be found with reference to FIG. 9.

The communication component 308 can facilitate wireless communication between the UE and other devices, such as between the UE 300 and other UEs via an M2M link and/or between the UE 300 and a wireless communication system network node (e.g., network node 104). The communication component 308 can be or include hardware (e.g., a central processing unit (CPU), a transmitter, a receiver, a transceiver, a decoder), software (e.g., a set of threads, a set of processes, software in execution) or a combination of hardware and software that facilitates one or more of the various types of wireless communications described herein. The power source 310 can provide power to the various electrical components of the UE 300 to facilitate operation thereof (e.g., the processor 306, the communication component 308, the IC card 314, etc.). The power source 310 can include, but is not limited to, a battery, a capacitor, a charge pump, a mechanically derived power source (e.g., microelectromechanical systems (MEMs) device), or an induction component.

The IC card 314 can include a fixed or removable integrated circuit chip. The IC card can include memory 316 that stores information and computer executable components or instructions (e.g., the capability information application 318). In some embodiments, the IC card 314 can include a micro-processor 330 to facilitate operation of at least some the instructions stored in the memory 316 (e.g., the capability information application 318). In other embodiments, the UE can be configured to employ processor 306 to execute the instructions stored in memory 316. For example, in some embodiments, the IC card 314 is a SIM card or a UICC that stores network subscriber data 328 that includes network-specific information used to authenticate and identify a subscriber on a wireless communication network (e.g., system 100). For example, the network subscriber data 328 can include but is not limited to, a unique serial number (ICCID) associated with the subscriber, an IMEI number associated with the subscriber, security authentication and ciphering information, temporary information related to the local network, a list of the services the subscriber has access to, and password information (e.g., a personal identification number (PIN) for ordinary use, and a personal unblocking code (PUK) for PIN unlocking. In addition, the IC card 314 can include one or more STK or CAT applications that consist of a set of commands programmed into the SIM/UICC card, which define how the SIM/UICC should interact directly with the outside world and initiates commands independently of the UE and the network. This enables the SIM/UICC to build up an interactive exchange between a network application and the end user and access or control access to the network. In one or more embodiments, at least one of these STK or CAT applications is a capability information application 318.

In accordance with various embodiments, the capability information application 318 can be configured to determine information regarding MTC capabilities of the UE 300 and automatically provide information identifying the MTC capabilities of the UE to the DCCS (e.g., DCCS 220) of the wireless communication network that facilitates various wireless communication services of the UE 300. In one or more embodiments, the capability information application 318 can include capability identification component 320, capability recording component 322, and capability reporting component 324. The capability identification component 320 can be configured to identify or determine defined MTC capabilities of the UE in response to start-up of the UE, a device reset, a new power cycle or another defined event. In particular, in response to start-up, (a reset, a new power cycle, etc.), of the UE 300, the capability identification component 320 can be configured to access information stored in memory 302 and/or memory 316 regarding features and functionalities of the UE to determine or identify defined MTC device capabilities of the UE 300. As previously described, these defined MTC capabilities can include a defined MTC device type or category of the UE (e.g., Cat-M1, Cat-M2, Cat-0, Cat-1, etc). In some embodiments, the MTC device type or category can relate to an uplink throughput of the UE and a downlink throughput of the UE. The defined MTC capabilities can also include defined MTC operating features supported (or not supported) by the UE.

For example, FIG. 4 provides a chart 400 illustrating example MTC device type/category information in accordance with various aspects and embodiments of the subject disclosure. As shown in chart 400, the MTC device type/category can include a device type/category supported on the downlink and a device type/category supported on the uplink downlink. A single Hex value can be employed to represent the specific downlink/uplink device type/category combination. For example, a UE can have the same device type/category on the downlink and the uplink or have a different downlink category relative to the uplink category. In some embodiments, the device type/category relates to at least in part, a data throughput or speed. Chart 400 demonstrate some example device downlink/uplink category combinations associated with the device types/categories defined by in the 3GGP Releases 12 and 13 (e.g., M1, M2, and Cat-0 through Cat-13). However, it should be appreciated that the potential device types/categories shown in chart 400 are merely exemplary and other device types/categories (e.g., associated with 4GGP Releases, 5GGP Releases and beyond) are envisioned.

Figure 5:
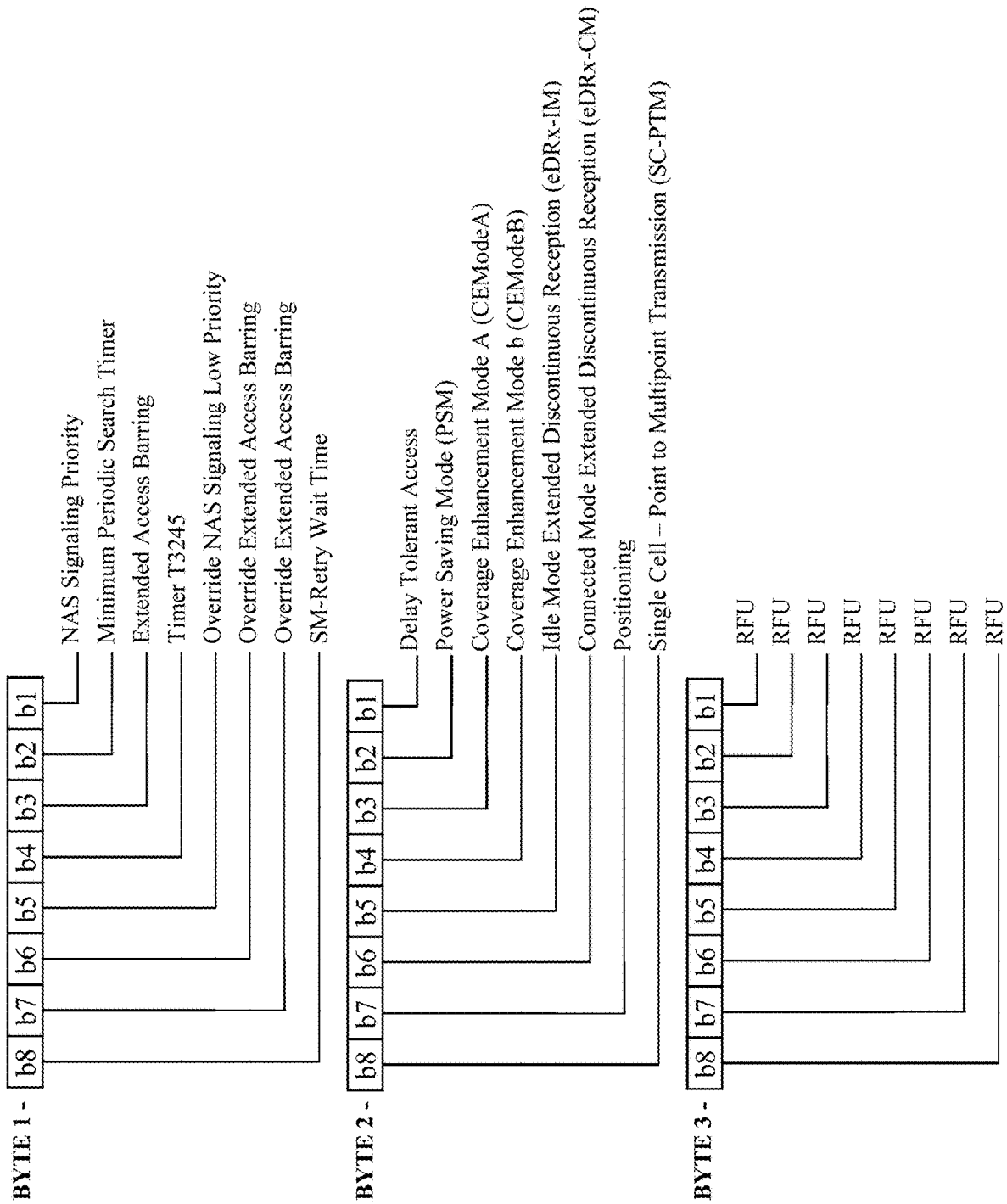
FIG. 5 presents example MTC device operating features in accordance with various aspects and embodiments of the subject disclosure.

FIG. 5 presents example MTC device operating features in accordance with various aspects and embodiments of the subject disclosure. In one or more embodiments, the UE MTC operating feature information can be associated with one or more data bytes, wherein respective bits (e.g., bits b1-b8) of the data bytes represent a defined MTC operating feature. In the embodiment shown, these defined MTC operating features include: NAS Signaling Priority, Minimum Periodic Search Time, Extended Access Barring, Timer T3245, Override NAS Signaling Low Priority, Override Extended Access Barring, SM-Retry Wait Time, Delay Tolerant Access, Coverage Enhancement Mode A (CEModeA), Coverage Enhancement Mode B (CEModeB), Idle Mode Extended Discontinuous Reception (eDRx, Connected Mode Extended Discontinuous Reception (eDRx), Positioning, and Single Cell-Point to Multipoint Transmission (SC-PTM). According to these embodiments, a first value (e.g., a 0) for a bit can indicate the UE does not support that MTC operating parameter and a second value (e.g., a 1) for the bit can indicate the UE supports that MTC operation parameter. For example, in the embodiment shown, three 8 bit bytes have been designated to represent MTC device operating parameters. The specific MTC operating parameters represented by the third byte have not yet been defined, as indicated by the term RFU associated with each bit, which represents "reserved for future use." According to this example, the third byte has been reserved to represent future MTC operating feature that may be implemented over time.

With reference back to FIG. 3, in response to start-up of the UE, (a device rest, a new power cycle, or another defined event), the capability identification component 320 can be configured identify or determine (e.g., based on information stored in memory 302 and/or memory 316) an MTC category of the UE 300 and what MTC operating features of a set of defined potential MTC operating features the UE supports (and/or does not support). The capability recording component 322 can further generate MTC capability information that identifies the specific MTC device type/category of the UE and the MTC operating features that are supported and/or not supported by the UE. For example, the capability recording component 322 can be configured to generate a data file with information identifying the MTC device category and operating features. In some embodiments, the capability recording component 322 can use a single data byte to represent the MTC device type/category. For example, in accordance with the examples shown in chart 400 of FIG. 4, because the device type/category can only be one possible Hex value of a set of Hex values, the device type can be defined by a single unique 8 bit byte. In other embodiments, the capability recording component 322 can use two (e.g., one for the downlink category and one of the uplink category) or more bytes to represent the UE MTC type/category. The capability recording component 322 can also be configured to use two or more bytes to represent the different MTC operating features supported (and not supported) by the UE (e.g., as discussed with reference to FIG. 5).

In some embodiments, in association with generation of the MTC capability information, the capability recording component 322 can be configured to store the MTC capability information in a data structure that is stored in the memory 316 of on the IC card 314. As noted above, in various implementations, this data structure is referred to as the "terminal support table." For example, in response to start-up of the UE, the capability identification component 320 can interface with the UE and identify or determine the defined MTC capabilities of the UE (e.g., the MTC category and MTC operating features). The capability recording component 322 can further write the device MTC capability information to the terminal support table 326.

The capability information application 318 can further include capability reporting component 324 to facilitate providing UE MTC capability information to the DCCS. In other embodiments, (not shown) the capability reporting component 324 can be associated with a different application provided in memory 316 or memory 302. In one or more embodiments, the capability reporting component 324 can be configured to send or direct the UE to send (e.g., using communication component 308) the MTC capability information to the DCCS using an OTA message sent via a M2S wireless communication link established between the UE 300 and a network node (e.g., network node 104). In one or more implementations, the OTA message can include a mobile originated (MO) short message service (SMS) class 2 message. SMS message classes identify the importance of the message and the location where it should be stored. There are four SMS message classes defined by the 3GGP standard, class 0, class 1, claim 2 and class 3. A class 2 is phase 2-specific and carries SIM/UICC data. With a MO-SMS class 2 message, the data is to be successfully transferred prior to sending acknowledgment to the SMS service center (SC). An error message is sent to the SC if this transmission is not possible.

In some embodiments, the capability reporting component 324 can be configured to automatically cause the UE 300 to send the MTC capability information (e.g., information identifying the UE MTC type/category and the MTC operating parameters supported/not supported by the UE) to the DCCS in response to identification/determination of the information by the capability identification component 320. With these embodiments, each time the UE 300 powers-up (is reset, or another defined event occurs), the UE will identify/determine MTC device capability information and send the MTC device capability information to the DCCS. In other embodiments, capability reporting component 324 can be configured to only send the DCCS UE MTC capability information that was not previously provided to the DCCS. For example, in association with start-up of the UE 300, the capability reporting component 324 can determine whether a specific data structure in memory 316 (e.g., the terminal support table 326) includes any MTC device capability information that was not previously included in the data structure prior to the start-up. The capability reporting component 324 can further be configured to send an OTA message to the DCCS including the UE MTC capability information included in the data structure in response to a determination that the UE MTC capability information was not included in the data structure prior to the start-up. Accordingly, after the capability reporting component 324 provides the DCCS with UE MTC capability information for the first time, the capability reporting component 324 will not provide the DCCS with UE MTC capability information unless the UE is updated with new MTC capability information or the original UE MTC capability information written in the terminal support table is removed (e.g., in response to a device master reset).

Figure 6:
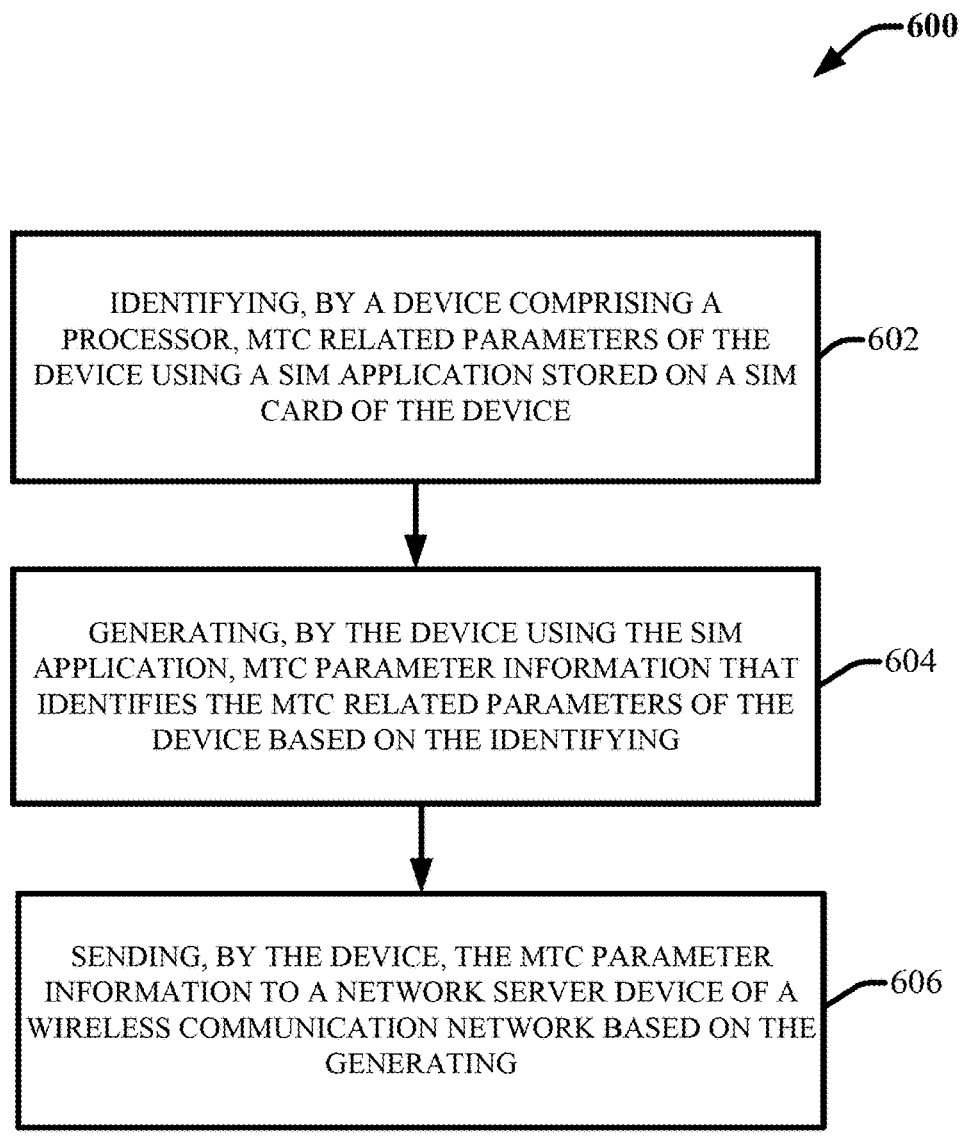
FIG. 6 illustrates an example method that facilitates device based network notification of device supported MTC features in accordance with various aspects and embodiments of the subject disclosure.
Figure 7:
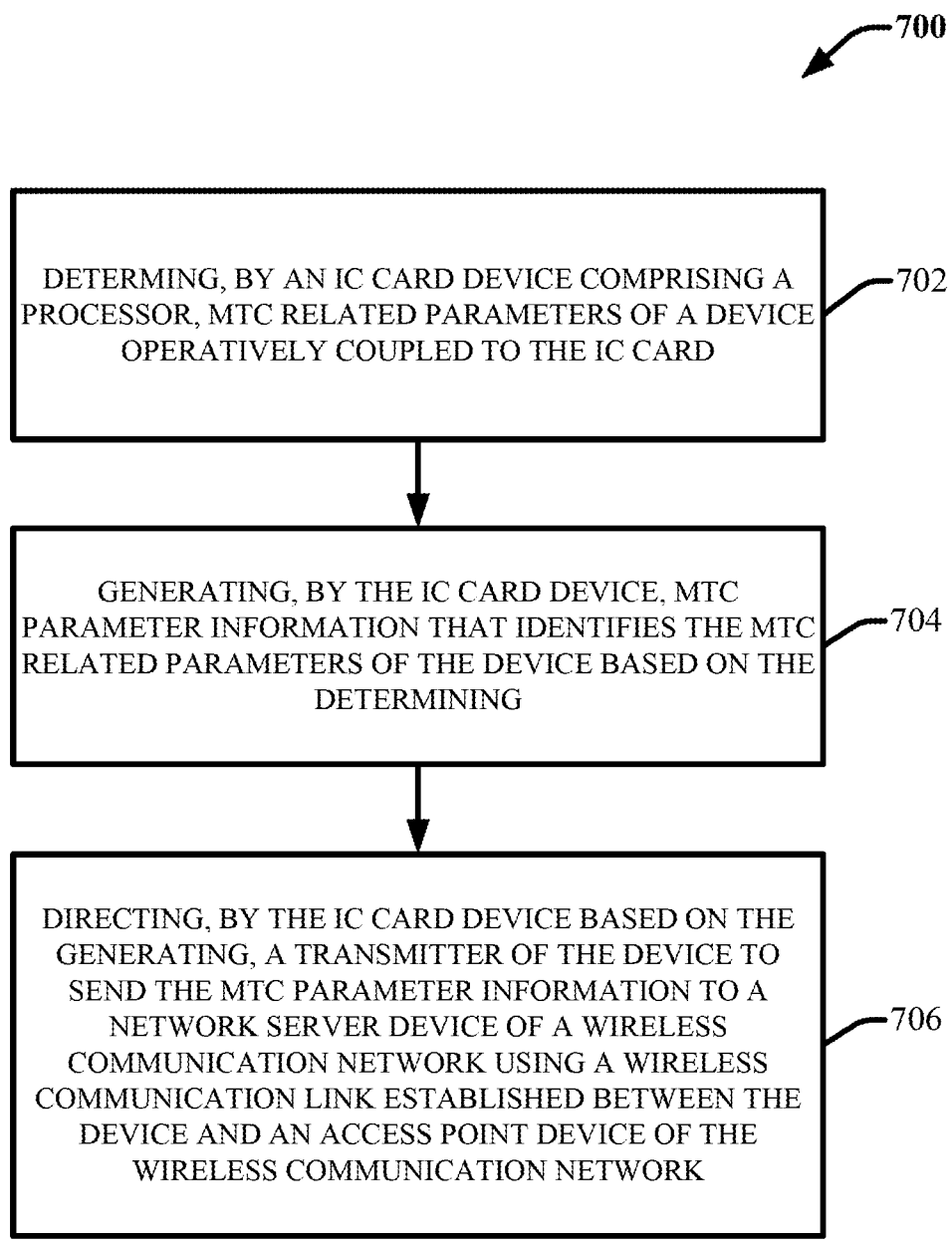
FIG. 7 illustrates another example method that device based network notification of device supported MTC features in accordance with various aspects and embodiments of the subject disclosure.
Figure 8:
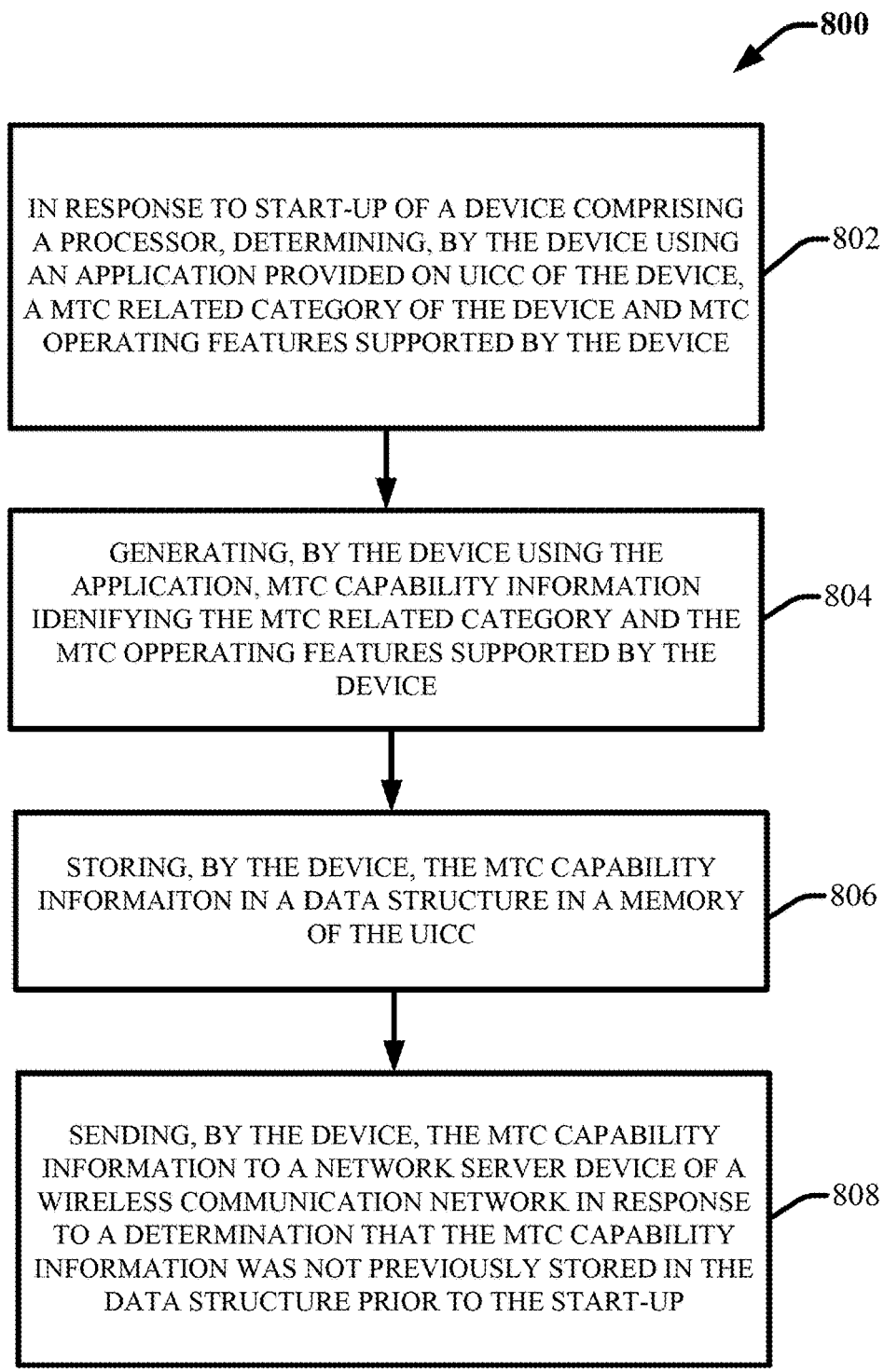
FIG. 8 illustrates another example method that device based network notification of device supported MTC features in accordance with various aspects and embodiments of the subject disclosure.

In view of the example system(s) described above, example method(s) that can be implemented in accordance with the disclosed subject matter can be better appreciated with reference to flowcharts in FIGS. 6-8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates an example method 600 that facilitates device based network notification of device supported MTC features in accordance with various aspects and embodiments of the subject disclosure. Repetitive description of like elements employed in respective embodiments is omitted for sake of brevity.

At 602, a device comprising a processor (e.g., a UE 102, UE 300 or the like), identifies MTC related parameters of the device using a SIM application (e.g., capability information application 318) stored on a SIM card (e.g., IC card 314) of the device. At 604, the device generates, using the SIM application, MTC information that identifies the MTC related parameters of the device based on the identifying the MTC related parameters. At 606, the device sends the MTC parameter information to a network server device (e.g., the DCCS 220) of a wireless communication network based on the generating.

FIG. 7 illustrates another example method 700 that facilitates device based network notification of device supported MTC features in accordance with various aspects and embodiments of the subject disclosure. Repetitive description of like elements employed in respective embodiments is omitted for sake of brevity.

At 702, an IC card device comprising a processor (e.g., IC card 314) determines MTC related parameters of a device operatively coupled to the IC card (e.g., UE 300). At 704, the IC card device, generates MTC parameter information that identifies the MTC related parameters of the device based on the determining. At 706, the directing, by the IC card device directs, based on the generating, a transmitter of the device (e.g., a transmitter of the communication component 308) to send the MTC parameter information to a network server device of a wireless communication network (e.g., DCCS 220) using a wireless communication link established between the device and an access point device (e.g., network node 104) of the wireless communication network.

FIG. 8 illustrates another example method 800 that facilitates device based network notification of device supported MTC features in accordance with various aspects and embodiments of the subject disclosure. Repetitive description of like elements employed in respective embodiments is omitted for sake of brevity.

At 802, in response to start-up of a device comprising a processor (e.g., a UE 102, UE 300 and the like), the device determines, using an application provided on a UICC of the device (e.g., capability information application 318), a MTC related category of the device and MTC operating features supported by the device (e.g., using capability identification component 320). At 804, the device generates, using the application, MTC related category and the MTC operating features supported by the device (e.g., using capability recording component 322). At 806, the device stores (e.g., using the capability recording component 322), the MTC capability information in a data structure (e.g., the terminal support table 326) in a memory of the UICC (e.g., memory 316). At 808, the device sends the MTC capability information to a network server device (e.g., DCCS 220) of a wireless communication network in response to a determination that the MTC capability information was not previously stored in the data structure prior to the start-up.

Figure 9:
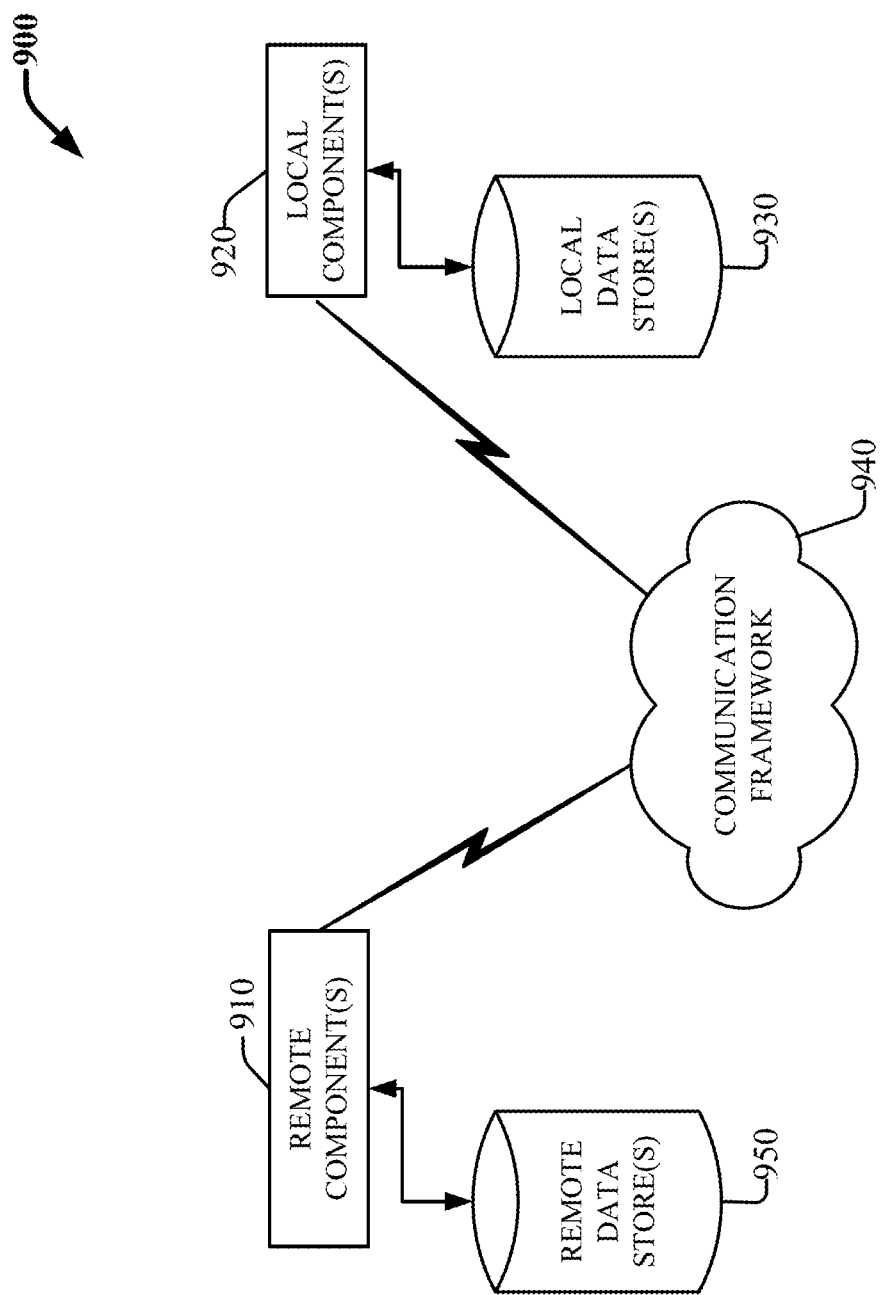
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, RAN device(s), etc. As an example, remote component(s) 910 can be network node 104, network devices 108, 200 and the like. The system 900 also comprises one or more local component(s) 920. The local component(s) 920 can be hardware and/or software (e.g., threads, processes, computing devices). In some embodiments, local component(s) 920 can comprise, for example, UEs 102, UE 300, and the like.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via an LTE network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
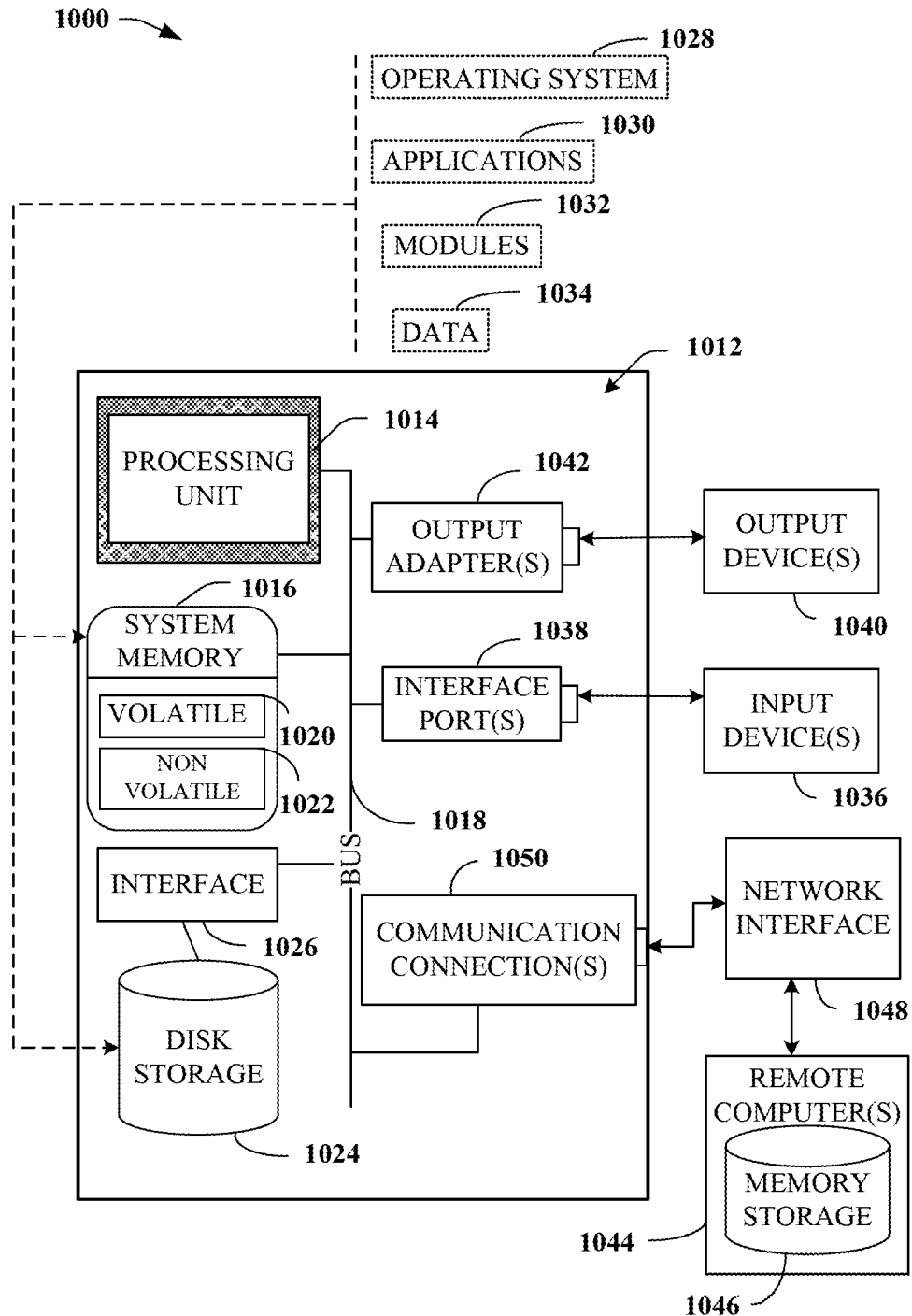
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, a UE (e.g., UE 102 and 300), a network node (e.g., network node 104), comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11104), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a subscriber identity module card comprising a processor, whether a terminal support data structure of the subscriber identity module card comprises new parameter information defining a machine-type communication parameter of a device operatively coupled to the subscriber identity module card that was previously excluded from the terminal support data structure; and
   facilitating, by the subscriber identity module card, provision of the new parameter information to network equipment via an application associated with the subscriber identity module card based on a determination that the terminal support data structure comprises the new parameter information.

2. The method of claim 1, wherein the determining is responsive to an activation of the application based on a start-up operation of the device or a reset operation of the device.

3. The method of claim 1, further comprising:
sending, by the subscriber identity module card via the application, the new parameter information to the network equipment to facilitate provisioning machine-type communication services for the device based on the new parameter information.

4. The method of claim 3, wherein the sending comprises sending the new parameter information using a mobile originated short message service class 2 message that was generated by the application.

5. The method of claim 3, wherein the network equipment facilitates the provisioning of the machine-type communication services by forwarding the new parameter information to additional network equipment other than the network equipment.

6. The method of claim 3, wherein the network equipment further facilitates charging a user account associated with the device for the provisioning of the machine-type communication services based on receiving the new parameter information.

7. The method of claim 1, wherein the machine-type communication parameter comprises a defined machine-type communication category of the device.

8. The method of claim 7, wherein the defined machine-type communication category relates to an uplink throughput of the device and a downlink throughput of the device.

9. The method of claim 7, wherein the determining is responsive to writing the parameter information to the terminal support data structure by the device using a single data byte that represents the defined machine-type communication category of the device.

10. The method of claim 1, wherein the machine-type communication parameter comprises a defined machine-type communication feature supported by the device.

11. The method of claim 10, wherein the wherein the determining is based on whether the terminal support data structure comprises a first bit value that indicates the device supports the defined machine-type communication feature or a second bit value that indicates the device does not support the defined machine-type communication feature.

12. The method of claim 1, wherein the provision comprises the provision of the new parameter information to the network equipment via a subscriber identity module application toolkit of the application.

13. A subscriber identity module card, comprising:
a processor, and
a memory operatively coupled to the processor that stores executable instructions; wherein the processor executes the executable instructions to perform operations comprising:
determining, via an application of the subscriber identity module card, whether a terminal support data structure of the subscriber identity module card comprises previously unavailable parameter information defining a machine-type communication parameter of a device operatively coupled to the subscriber identity module card that was previously excluded from the terminal support data structure; and
sending, via the application, the previously unavailable parameter information to a network server associated with the subscriber identity module card based on a determination that the terminal support data structure comprises the previously unavailable parameter information.

14. The subscriber identity module card of claim 13, wherein the determining is responsive to a start-up operation of the device resulting in an initiation of an execution of the application.

15. The subscriber identity module card of claim 13, wherein the determining is responsive to a reset operation of the device resulting in an initiation of an execution of the application.

16. The subscriber identity module card of claim 13, wherein the sending comprises sending the previously unavailable parameter information to the network server using a short message service class 2 message generated by the application.

17. The subscriber identity module card of claim 13, wherein the machine-type communication parameter comprises a defined machine-type communication category of the device.

18. The subscriber identity module card of claim 13, wherein the machine-type communication parameter comprises a defined machine-type communication feature supported by the device.

19. A non-transitory machine-readable medium, comprising executable instructions that, when executed by a processor of a subscriber identity module card operatively coupled to a device, facilitate performance of operations, comprising:
determining whether a terminal support data structure of the subscriber identity module card comprises updated parameter information defining a machine-type communication parameter of the device that was previously excluded from the terminal support data structure; and
sending the updated parameter information to a server system associated with the subscriber identity module card based on a determination that the terminal support data structure comprises the updated parameter information.

20. The non-transitory machine-readable medium of claim 19, wherein the determining is responsive to performance of a start-up operation of the device or a reset operation of the device.

* * * * *